Patented Aug. 5, 1952

2,606,203

UNITED STATES PATENT OFFICE 2,606,203

PHTHALAMIDATE SUBSTITUTED ORTHO PHOSPHORIC ACIDS AND THEIR SALTS

Herschel G. Smith, Wallingford, and Troy L. Cantrell, Lansdowne, Pa., and John G. Peters, Audubon, N. J., assignors to Gulf Oil Corporation, Pittsburgh, Pa., a corporation of Pennsylvania No Drawing. Application November 8, 1949, Serial No. 126,241

18 Claims. (Cl. 260—461)

This invention relates to new organic compounds and to their methods of preparation; more particularly, to phthalamidate-substituted ortho phosphoric acids and their salts. These phthalamidate-substituted ortho phosphoric acids and the salts thereof have been found valuable as rust preventive compounds, corrosion inhibitors, and as additives for mineral oil compositions.

In general, our new compounds are either phthalamidate-substituted ortho phosphoric acids or the salts thereof and may be defined as compounds selected from the class consisting of (1) acids having the formula:

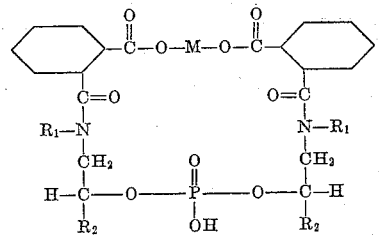

wherein M is a divalent metal, $R_1$ is selected from the group consisting of alkyl and alkenyl radicals containing from 8 to 22 carbon atoms, and $R_2$ is a member of the class consisting of hydrogen and alkyl radicals; and (2) salts thereof.

The phthalamidate-substituted ortho phosphoric acids of this invention can be prepared as follows. There is first prepared a divalent metal salt of an N-alkyl or alkenyl, N-alkylol phthalamidic acid, i. e., a compound of the formula:

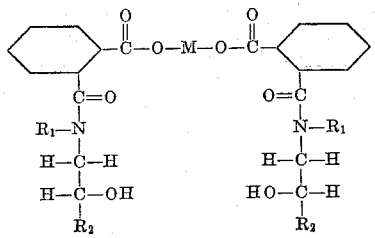

wherein M is a divalent metal, $R_1$ is selected from the group consisting of alkyl and alkenyl radicals containing from 8 to 22 carbon atoms, and $R_2$ is a member of the class consisting of hydrogen and alkyl radicals. The method of preparation of such compounds is described in our U. S. Patent 2,408,103. The above phthalamidic acid salts are then reacted with an esterifying derivative of ortho phosphoric acid to form the phthalamidate-substituted ortho phosphoric acid. If a salt of the resulting acid is desired, the acid is neutralized with an organic or inorganic base.

It will be noted that the N-alkylol grouping in the above-described phthalamidate salt results in the presence of two hydroxyl groups in the molecule. Accordingly, in preparing the phthalamidate-substituted ortho phosphoric acids of this invention, the two hydroxyl groups in the phthalamidate salt are esterified by a suitable esterifying derivative of ortho phosphoric acid, for example, phosphorus pentoxide, phosphorus oxychloride or the like. Of course, when phosphorus oxychloride is used, the residual chlorine is hydrolyzed off, in a manner known to the art, to obtain our phthalamidate-substituted ortho phosphoric acid. The amount of the ortho phosphoric acid derivative employed is such as to esterify both free hydroxyl groups in the above phthalamidate salt. Thus, for each mol of the phthalamidate salt employed, there is employed one-half mol of phosphorus pentoxide or one mol of phosphorus oxychloride.

The salts of the phthalamidate-substituted ortho phosphoric acids of our invention are simply prepared by neutralization with a suitable base. Either inorganic bases or organic nitrogen bases are employed. Inorganic salts can also be prepared by metathesis of an alkali metal salt of the phthalamidate-substituted ortho phosphoric acid and a water-soluble inorganic salt of another metal.

In the preparation of our new compounds, it is convenient to prepare them in situ in a solvent or diluent. Mineral oils are excellent diluents. However, other hydrocarbons can also be used. Particularly suitable are volatile hydrocarbon solvents, such as naphtha and Stoddard solvent, which can be removed by evaporation if necessary.

As a class the new acids and salts of our invention are light brown solids of indefinite melting point. They are soluble in mineral lubricating oils, naphtha, carbon tetrachloride, carbon disulfide and benzene, but are insoluble in alcohol, water, acetone and glycol.

The following examples are illustrative of the preparation of a few of the compounds which are disclosed herein. However, our invention is not to be limited to these particular examples. Unless otherwise indicated, all parts are by weight.

Example I

Into an iron reaction vessel, there were charged 892 parts of the calcium salt of N-cetyl, N-propanol phthalamidic acid which was then heated to a temperature of 170° F. Thereafter 35 parts of phosphorus pentoxide dispersed in 20 parts of a mineral lubricating oil having a viscosity of 150 S. U. S. at 100° F. were added to the phthalamidate in the reaction vessel over a period of 2 hours. The temperature was then raised to 220° F. to complete the reaction. The product obtained was a light brown solid of indefinite melting point, insoluble in water and alcohol, but soluble in benzene, naphtha and mineral lubricating oils. It had the formula:

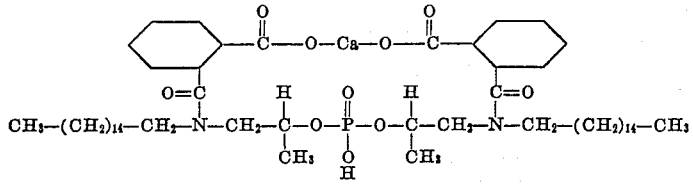

*Example II*

Into an iron reaction vessel there was charged 892 parts of the calcium salt of N-cetyl, N-propanol phthalamidic acid which was then heated to 170° F. Then 153 parts of phosphorus oxychloride were added and the temperature raised to 220° F. to complete the reaction. Thereafter 148 parts of hydrated lime in a 50 per cent water slurry were added to remove the hydrochloric acid by-product and to hydrolyze the remaining chlorine atom in the reaction product, thus making the calcium salt of the reaction product. The product was then diluted with 950 parts of benzene, the water layer was drawn off and the benzene layer was filtered. The filtered benzene solution was then transferred to an iron stirring still and the benzene removed under a vacuum of 20 inches of mercury. The salt obtained as a residue was a neutral light brown solid of indefinite melting point. It had the following formula:

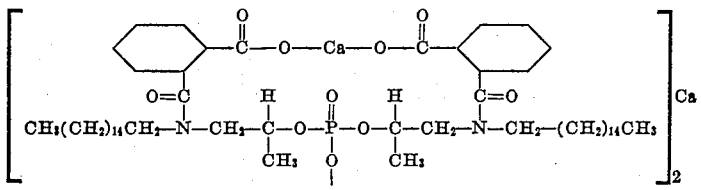

*Example III*

Into an iron reaction vessel were placed 832 parts of the calcium salt of N-dodecyl, N-propanol phthalamidic acid, 60 parts of 150 viscosity S. U. S./100° F. mineral lubricating oil, and 22 parts of phosphorus pentoxide. The reactants were heated to a temperature of 230° F. until the reaction was complete. The reaction product was then neutralized with 6 parts of calcium hydroxide at 240° F. and filtered. The compound so prepared had the formula:

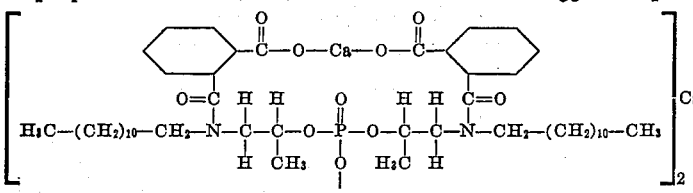

and its solution in the mineral oil had the following properties:

Gravity, °API_____ 18.0
Viscosity, SUV:
  100° F._____ 283.3
  210 _____ 51.0
Color, NPA_____ 3.75
Neutralization No._____ 4.04
Ash, per cent_____ 2.91
pH value_____ 7.7

*Example IV*

Into an iron reaction vessel were placed 832 parts of the calcium salt of N-dodecyl, N-propanol phthalamidic acid, 22 parts of phosphorus pentoxide, and 50 parts of 150 viscosity S. U. S./100° F. mineral lubricating oil. The reactants were heated to a temperature of 230° F. until the reaction was complete. The product was then neutralized with 61 parts of cocoamine.

The compound thus prepared had the formula:

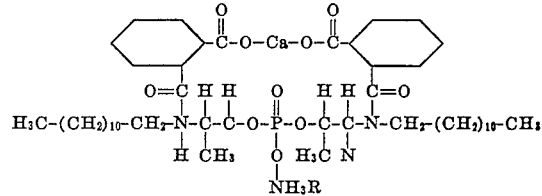

wherein R is the "coco" radical; and its solution in the mineral oil had the following properties:

Gravity, °API_____ 20.3
Viscosity, SUV:
  100° F._____ 307
  210 _____ 52.4
Color, NPA_____ 3.25
Neutralization No._____ 10.52
Ash as oxide, per cent_____ 1.8
pH value_____ 7.7

The N-alkyl or alkenyl, N-alkylol phthalamidic acid divalent metal salts from which our phthalamidate-substituted ortho phosphoric acid is made can be obtained from any suitable source. As indicated hereinabove, a convenient method of preparing these divalent metal salts is described in our U. S. Patent 2,408,103. By this method secondary alkyl, alkylol amines are first prepared by reacting alkylene oxides, such as ethylene oxide, propylene oxide, butylene oxide, etc., with primary alkyl or alkenyl amines. Suitable primary alkyl or alkenyl amines are those having from 8 to 22 carbon atoms, such as octyl, decyl, decenyl, undecenyl, dodecenyl, dodecyl (lauryl), tetradecyl, hexadecyl (cetyl), octadecyl (stearyl), 9,10-octadecenyl (oleyl), eicosyl, eicosenyl, docosyl, etc. The resulting alkylol amines are then reacted with phthalic anhydride in substantially equimolecular amounts to form a mono-o-amide of phthalic acid, namely the desired N-alkyl or alkenyl, N-alkylol phthalamidic acid, which is then converted to the divalent metal salt. Any divalent metal can be used in the preparation of the salt, including calcium, magnesium, barium, lead, cadmium, copper, strontium, tin, iron, zinc, cobalt, etc.

As has been indicated hereinabove, various salts of the phthalamidate-substituted ortho phosphoric acids of our invention are simply prepared by neutralization or metathesis. For example, alkali metal and ammonium salts can be prepared by neutralizing the acid with a hydroxide or carbonate of an alkali metal such as sodium, potassium, lithium, ammonium, etc. Other suitable hydroxides yielding valuable salts are calcium, barium, magnesium, strontium and aluminum hydroxides. Salts of these metals as well as salts of zinc, copper, tin, lead, iron, cobalt, nickel, manganese, cadmium, mercury, bismuth, vanadium, chromium, etc. can conveniently be prepared by metathesis of a water-soluble inorganic salt of such metal with an alkali metal salt of our phthalamidate-substituted ortho phosphoric acid.

Organic nitrogen bases also yield valuable addition salts. Such bases include primary, secondary and tertiary aliphatic and aromatic amines, alkylol amines and heterocyclic nitrogen bases. Primary alkyl amines such as ethyl, butyl, amyl, hexyl, cyclohexyl, heptyl, octyl, decyl, undecyl, lauryl, tetradecyl, hexadecyl, octadecyl and eicosyl are suitable. Mixtures of primary alkyl amines, such as are present in commercially available amines derived from fatty acids by well known methods, make desirable salts. For example, cocoamine, derived from coconut oil fatty acids and containing primarily dodecyl amine with smaller amounts of homologues, yields a preferred salt. Primary alkenyl amines corresponding to the primary alkyl amines, such as undecenyl, oleyl, etc., can also be employed. Preferred primary alkyl or alkenyl amines are those having from 8 to 22 carbon atoms. Other amines are also used with good results. For example, salts derived from secondary and tertiary amines, whether aliphatic or aromatic, such as the di- and tri-ethanolamines, dicyclohexyl amine, aniline, N-alkyl and N-dialkylarylamines, e. g. N-ethylaniline, N-dimethylaniline, are satisfactory. A valuable class of salts is derived from heterocyclic nitrogen bases such as pyridine, picoline, ethyl pyridine, lutidine, aldehydine, parvoline, quinoline, quinaldine, lepidine, isoquinoline, nicotine, piperidine, morpholine, N-phenyl morpholine, etc.

The acids and salts of our invention are useful in many arts, particularly as corrosion inhibitors. In particular, they are valuable as mineral oil additives where corrosion and rust inhibiting properties are desired, and as improvement agents for lubricating greases. They are useful in preparing a wide range of compositions having corrosion preventing properties. For example, the compounds of our invention can be used to prepare corrosion-preventing coating compositions, such as slushing oils and paints. In this connection, they may be compounded with various film-forming materials such as resins, asphalts, waxes, drying oils and the like. Our new compounds are also useful and advantageous in preparing improved motor oils for aviation and Diesel engines.

The following example shows the use of one of our compounds in preparing an improved mineral lubricating oil.

Example V

An improved lubricating oil was prepared by the addition of 0.3 per cent by weight of the compound of Example IV, supra, to a mineral lubricating oil base. As shown in the following table the additive did not affect any of the beneficial properties of the lubricating oil base and in addition conferred anticorrosion properties on the oil.

|  | Base Oil | Improved Oil |
| --- | --- | --- |
| Gravity, °API | 31.8 | 31.8 |
| Viscosity, SUV: |  |  |
| 100° F | 151.7 | 151.0 |
| 210 | 43.5 | 43.3 |
| Viscosity Index | 100 | 100 |
| Pour, °F | +15 | +15 |
| Color, NPA | 1.25 | 1.25 |
| Copper Strip Test | passes | passes |
| Neutralization No | 0.01 | 0.08 |
| Corrosion Test, ASTM D 665-47 T: |  |  |
| Distilled Water— |  |  |
| Steel Rod, Appearance | rust | bright |
| Area Rusted, percent | 100 | 0 |
| Synthetic Sea Water— |  |  |
| Steel Rod, Appearance | rust | bright |
| Aera Rusted, percent | 100 | 0 |

The use of the compounds of our invention in mineral oil lubricant compositions is described and claimed in our copending application Serial No. 126,242 filed of even date herewith.

While our invention has been described above with reference to various representative examples and embodiments, it will be understood that the invention is not limited to such illustrative examples and embodiments, but may be variously practiced within the scope of the claims herein made.

We claim:

1. A process for the preparation of a phthalamidate-substituted ortho phosphoric acid which comprises esterifying with a compound selected from the group consisting of phosphorus pentoxide and phosphorus oxychloride the two hydroxyl groups of a divalent metal salt of an N-substituted phthalamidic acid having the formula:

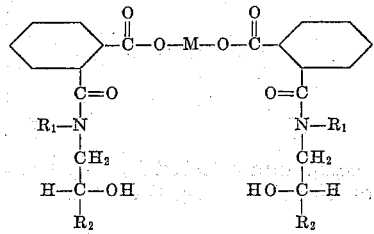

wherein M is a divalent metal, $R_1$ is selected from the group consisting of alkyl and alkenyl radicals having from 8 to 22 carbon atoms and $R_2$ is a member of the class consisting of hydrogen and alkyl radicals.

2. The process of claim 1, wherein the esterifying compound is phosphorus pentoxide.

3. A process for the preparation of a salt of a phthalamidate-substituted ortho phosphoric acid which comprises esterifying with phosphorus pentoxide the two hydroxyl groups of a divalent metal salt of an N-substituted phthalamidic acid having the formula:

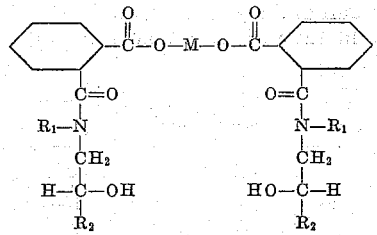

wherein M is a divalent metal, $R_1$ is selected from the group consisting of alkyl and alkenyl radicals having from 8 to 22 carbon atoms, and $R_2$ is a member of the class consisting of hydrogen and alkyl radicals, and forming a salt of the resulting substituted ortho phosphoric acid.

4. The process of claim 3, wherein the salt is formed by neutralization of the substituted ortho phosphoric acid with an inorganic base.

5. The process of claim 3, wherein the salt is formed by neutralization of the substituted ortho phosphoric acid with an alkaline earth metal hydroxide.

6. The process of claim 3, wherein the salt is formed by neutralization of the substituted ortho phosphoric acid with an organic nitrogen base.

7. The process of claim 3, wherein the salt is formed by neutralization of the substituted ortho phosphoric acid with a primary aliphatic amine having from 8 to 22 carbon atoms.

8. A process for the preparation of a salt of phthalamidate-substituted ortho phosphoric acid which comprises esterifying with phosphorus pentoxide the two hydroxyl groups of the calcium salt of N-dodecyl, N-propanol phthalamidic acid, and neutralizing the resulting product with calcium hydroxide.

9. A process for the preparation of a salt of a phthalamidate-substituted ortho phosphoric acid which comprises esterifying with phosphorus pentoxide the two hydroxyl groups of the calcium salt of N-dodecyl, N-propanol phthalamidic acid, and neutralizing the resulting product with coco amine.

10. A process for the preparation of a phthalamidate-substituted ortho phosphoric acid which comprises esterifying with phosphorus pentoxide the two hydroxyl groups of the calcium salt of N-cetyl, N-propanol phthalamidic acid.

11. A compound selected from the group consisting of an acid having the formula:

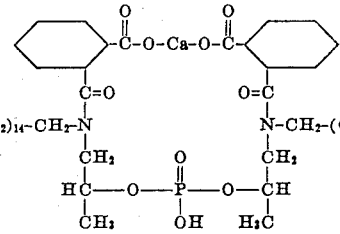

and salts thereof, wherein M is a divalent metal, $R_1$ is selected from the group consisting of alkyl and alkenyl radicals having from 8 to 22 carbon atoms, and $R_2$ is a member of the class consisting of hydrogen and alkyl radicals.

12. A metal salt of an acid having the formula:

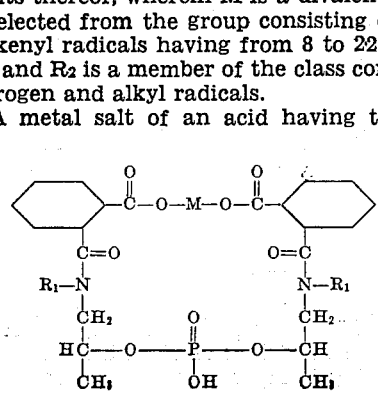

wherein M is a divalent metal and $R_1$ is an alkyl radical having from 8 to 22 carbon atoms.

13. The compounds of claim 12, wherein M is an alkaline earth metal, and the metal of the metal salt is also an alkaline earth metal.

14. A salt of an organic nitrogen base and an acid having the formula:

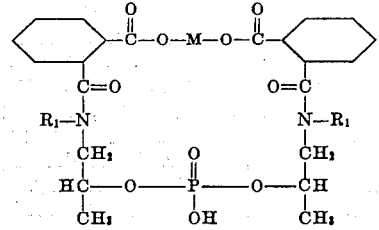

wherein M is a divalent metal and $R_1$ is an alkyl radical having from 8 to 22 carbon atoms.

15. The compounds of claim 14, wherein the organic nitrogen base is a primary aliphatic amine having from 8 to 22 carbon atoms.

16. A substituted ortho phosphoric acid having the formula:

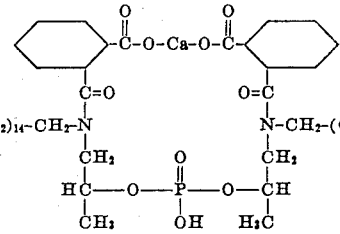

17. A calcium salt of a substituted ortho phosphoric acid, said salt having the formula:

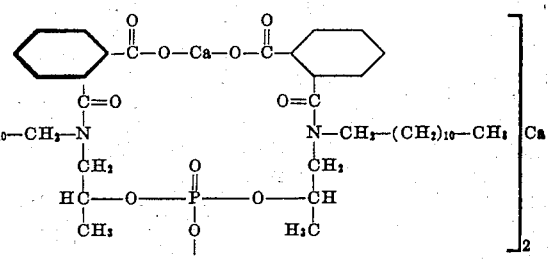

18. A cocoamine salt of a substituted ortho phosphoric acid, said salt having the formula:

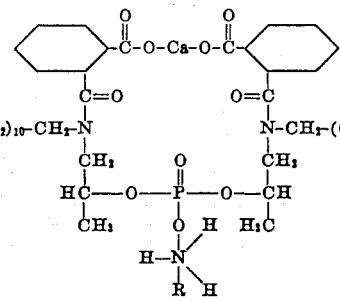

wherein R is the "coco" radical.

HERSCHEL G. SMITH.
TROY L. CANTRELL.
JOHN G. PETERS.

REFERENCES CITED

The following references are of record in the file of this patent:

UNITED STATES PATENTS

| Number | Name | Date |
|---|---|---|
| 2,400,611 | Smith et al. | May 21, 1946 |